US005515057A

United States Patent [19]

Lennen et al.

[11] Patent Number: 5,515,057

[45] Date of Patent: May 7, 1996

[54] GPS RECEIVER WITH N-POINT SYMMETRICAL FEED DOUBLE-FREQUENCY PATCH ANTENNA

[75] Inventors: Gary R. Lennen, San Jose; Wilfred Hand; Brian Westfall, both of Mountain View, all of Calif.

[73] Assignee: Trimble Navigation Limited, Sunnyvale, Calif.

[21] Appl. No.: 301,115

[22] Filed: Sep. 6, 1994

[51] Int. Cl.$^{6}$ .............................. H04B 7/185; H01Q 1/38

[52] U.S. Cl. .................................... 342/357; 343/700 MS

[58] Field of Search .................................... 342/357, 363, 342/365; 343/700 MS

[56] References Cited

U.S. PATENT DOCUMENTS 4,827,271 5/1989 Berneking et al. .............. 343/700 MS
5,134,407 7/1992 Lorenz et al. .......................... 342/352
5,241,321 8/1993 Tsao ................................ 343/700 MS

OTHER PUBLICATIONS

Perreault, "Civilian Receivers Navigate by Satellite", MSN, vol. 11, No.1, Jan. 1981.

*Primary Examiner*—Gregory C. Issing
*Attorney, Agent, or Firm*—Boris G. Tankhilevich

[57] ABSTRACT

Apparatus and method for eliminating the time delay variation associated with the satellite signal propagating within an antenna for a GPS receiver (or GLONASS receiver). The antenna is an n-point symmetrical feed double-frequency feed antenna which has the reduced electrical center error ellipsoid as compared with the single point antenna. The angular dependence of the time delay variation on the azimuth and the angle of elevation of the incoming satellite signal is reduced in case of n-feed point symmetrical antenna. The GPS receiver with n-point antenna can be used for differential GPS, both static and dynamic, and for absolute GPS positioning.

9 Claims, 3 Drawing Sheets

GPS RECEIVER WITH N-POINT SYMMETRICAL FEED DOUBLE-FREQUENCY PATCH ANTENNA

BACKGROUND

A differential GPS receiver is widely used for conducting the precise survey measurements. The differential GPS receiver includes an antenna. The standard GPS antenna is a microwave strip or a patch antenna. Parallelogram-shaped, preferably square, radiating elements are commonly used for patch antennas. In this form, the antenna constitutes essentially a pair of resonant dipoles formed, for example, by two opposite edges of the patch. The microwave patch is of such dimensions that either pair of adjacent sides can serve as halfwave radiators, or the resonant dipole edges may be from a quarter wavelength to a full wavelength long.

The GPS antenna receives the satellite signals from a multiplicity of satellites located virtually anywhere overhead from horizon to horizon. It has been found that the circular polarization of the Rd. Satellite signals is necessary and desirable. Thus, the incoming satellite signal has the right hand circular polarization. Accordingly, the GPS system is also required to have the circular polarization to exclude the dependence of an amplitude of the received signal on azimuth and elevation angle of the incoming satellite signal.

Circular polarization of patch antennas has been achieved in a variety of ways. For example, circular polarization may be obtained when the input coupling point to the signal radiator patch is located within the interior of the patch, along a diagonal line from one corner of the patch to the other. In U.S. Pat. No. 3,921,177 Munson discloses a patch antenna with a feed arrangement that permits the exciting of a pair of orthogonal radiation modes with slightly different frequencies out of phase by 90 degrees. However, the slight variations in the size of the edges of the patch or small variation in the dielectric constant of the substrate can have a significant effect on the resonant frequency and, therefore, on the degree of the circular polarization achieved.

Such shortcomings in microstrip antennas having coplanar radiating elements and feeds have been recognized in U.S. Pat. No. 4,054,874 which discloses reactive coupling of antenna elements. U.S. Pat. No. 4,054,874 issued to Fasset, also discloses capacitively coupled patch antenna elements. However, the bandwidth of the antenna structures so coupled has been found unacceptably narrow.

In U.S. Pat. No. 4,163,236, issued to Kaloi, a corner fed microstrip antenna is disclosed. Kaloi explains how to achieve circular polarization from a single feed line but does not show capacitive coupling to the radiator patch.

Han and Janky, in U.S. Pat. No. 5,165,109, disclose a high performance circularly polarized patch antenna which utilizes a stripline feed circuit to eliminate radiation losses. In one embodiment the apparatus includes a laminated structure having an r.f. radiating conductor affixed on the top side and a feed coupling network within. The r.f. radiating conductor is capacitively coupled to the feed coupling network, a portion of which is sandwiched between suitable ground plane conductors to prevent radiation losses.

The prior art discloses a number of patents on microstrip microwave antennas with circular polarization and broad bandwidth.

In U.S. Pat. No. 5,274,391, Connoly discloses a broadband directional antenna having binary- feed network with microstrip transmission line. The feed network and the dipole antenna utilize impedance matching techniques to provide the most broadband impedance possible.

In U.S. Pat. No. 5,307,075, Huynh describes a monolithically loaded microstrip antenna with a single feed line. The apparatus provides a communication function such as a cellular telephone base station. The antenna includes a ground plane and a group of stacked, planar elements. A director element having a rectangular configuration together with monolithic load tabs is connected to a feed line and spaced above the ground plane. A group of eight of the antennas are positioned in a column to form an antenna array which has substantial vertical polarization, a relatively wide horizontal beam width, and a broad bandwidth.

Iwasaki, in U.S. Pat. No. 5,287,116, discloses an array antenna generating circularly polarized waves with a plurality of microstrip antennas. A microstrip antenna includes a ground conductor plate and a patch opposed to the ground conductor plate with a particular distance, a transmission feed line, and a reception feed line disposed between the ground conductor plate and the patch. Signals are fed from these feed lines to the patch by electromagnetic coupling. The mutual coupling between transmission and reception can be suppressed to a low level, but can not be removed.

In U.S. Pat. No. 5,220,334, Raguenet describes a multi-frequncy antenna useable for space telecommunications. The apparatus includes a microstrip patch first antenna operating at one or more frequencies, and a second antenna disposed in front of the first antenna and using the same radiating surface and operating at a different frequency.

Nakahara and Matsunaga in U.S. Pat. No. 5,243,353, disclose a circularly polarized broadband microstrip antenna with a ground plane, a disk-shaped driven element, and a disk-shaped parasitic element. The driven element is located between the ground plane and the parasitic element and is parallel to both of them. The disclosed circularly polarized antenna has the improved impedance bandwidth.

In U.S. Pat. No. 5,319,378, Nalbandian and Lee describe a multi-band microstrip antenna capable of dual-frequency operation. The disclosed antenna can be used in a multi-frequency system without the necessity of having a plurality of separate antennas. The antenna comprises a microstrip having a thin rectangular metal strip that is supported above a conductive ground plane by two dielectric layers which are separated by an air gap or other lower dielectric constant material. Conducting side walls and a rear wall extend between the ground plane and the strip. The ground plane, the strip, the walls and an opening at the front cooperate to form a rectangular resonant cavity. In essence, the cavity is surrounded by conducting surfaces except for the front opening and a small opening in the ground plane that accommodates an antenna feed. The front opening of the cavity functions as an antenna aperture through which the antenna transmits and/or receives energy. The antenna feed is coaxial transmission line that provides a means for coupling the antenna to an external circuit. The spaced dielectric layers and the air gap produces higher-order modes which causes dual frequencies.

In U.S. Pat. No. 5,325,105, Kerbs and Anderson disclose an ultra-broadband TEM double flared exponential horn antenna. The apparatus includes an ultra-broadband transverse electromagnetic TEM exponential antenna in which the radiating or receiving structure includes a feed end. Two TEM horn design embodiments are described and differ only in the launching device by which the radiating structure is fed, which converts an input unbalanced transverse electromagnetic wave into a balanced transverse electromagnetic wave. A first preferred embodiment employs a stripline infinite balun as a launching device, while a second preferred embodiment employs a cavity backed waveguide as a launching device. An input coaxial connector introduces an unbalanced transverse electromagnetic wave into the launching device, either the infinite balun or the cavity backed waveguide.

In U.S. Pat. No. 5,289,196, Gans and Schwartz disclose an improved antenna used for a Doppler radar navigation. The improved antenna satisfies a number of very stringent requirements that are tailored to achieve the precise Doppler overwater measurements. An apparatus includes a space duplexed beamshaped microstrip antenna system including transmit and receive antennas, each of which has two groups of interleaved arrays. The array groups are slanted in opposite directions and each is fed from opposite corners of the antenna so that each group utilizes its entire reduced width aperture to create the required beam contours for two beams. To achieve frequency and temperature compensation, one of the antennas is made up of forward firing arrays and the other of the antennas is made up of backward firing arrays.

Sreenivas in U.S. Pat. No. 5,231,406 discloses a broadband, circular polarization antenna for use on a satellite. In one embodiment, signals are fed to, or received by, an array of electromagnetically coupled patch pairs arranged in sequential rotation by an interconnect network which is coplanar with the coupling patches of the patch pairs. The interconnect network includes phase transmission line means, the lengths of which are preselected to provide the desired phase shifting among the coupling patches. The complexity of the array and the space required are thus reduced. In the preferred embodiment, two such arrays are employed, each having four patch pairs. The two arrays are arranged in sequential rotation to provide normalization of the circularly polarized transmitted or received beam.

U.S. Pat. No. 5,210,542, issued to Pett and Olson, discloses a microstrip patch antenna structure having increased bandwidth and reduced coupling while maintaining low profile capabilities. The structure includes a support member having an isolated recess in which an electromagnetically coupled patch pair of antenna elements is positioned, the upper element being substantially flush with the surface of the support member surrounding the recess. To enhance isolation of the elements, the recess walls and the support surface are preferably electrically conductive and connected to ground.

An apparatus including a planar microstrip Yagi antenna array is disclosed in U.S. Pat. No. 5,220,335 issued to Huang. A directional microstrip antenna includes a driven patch surrounded by an isolated reflector and one or more coplanar directors, all separated from a groundplane on the order of 0.1 wavelength or less to provide endfire beam directivity without requiring power dividers or phase shifters. The antenna may be driven at a feed point a distance from the center of the driven patch in accordance with conventional microstrip antenna design practices for H-plane coupled or horizontally polarized signals. The feed point for E-plane coupled or vertically polarized signals is at a greater distance from the center than the first distance. This feed point is also used for one of the feed signals for circularly polarized signals. The phase shift between signals applied to feed points for circularly polarized signals must be greater than the conventionally required 90° and depends upon the antenna configuration.

In U.S. Pat. No. 5,229,777, Doyle discloses a microstrip antenna for radiating a broad bandwidth of input signals. A pair of identical triangular patches are maintained upon a ground plane, with feed pins being connected to conductive planes of the triangular patches at apexes maintained in juxtaposition to each other. Sides of the conductive planes opposite such apexes are grounded and the radiating slots are formed by the other sides adjacent to the apexes and the ground plane. The input signals to the pair of patches are of equal amplitude, but 180° out of phase. The triangular nature of the patches provides a broad range of signal separation such that the resulting microstrip antenna can accommodate a broad range of input signals and radiate the same.

Mason, Tom and Woo in U.S. Pat. No. 5,272,485, disclose a microstrip antenna with a minimum noise feedpoint used in global positioning system (GPS) receivers. The apparatus includes a diagonally fed electric microstrip RHP antenna having a ceramic substrate, a groundplane on one side of the substrate, a rectangularly-shaped radiator attached to the other side of the substrate, and a wire that passes through the substrate and connects to a point on the radiating electrode that provides the predetermined impedance and a noise figure minimum. The output matching network is used for coupling the active device to an external system, such as a Global Positioning System (GPS) receiver.

The prior art describes different types of circular polarized microstrip antennas. However, the prior art does not disclose a system including a GPS receiver having a symmetrically fed n-point circular polarized microstrip antenna. It is desirable to have a GPS receiver using a symmetrical n-point feed microstrip antenna for receiving circular polarized satellite signals.

SUMMARY OF THE INVENTION

The present invention is unique because it provides a system including a GPS receiver having a circular polarized symmetrically fed n-point microstrip antenna.

One aspect of the present invention is directed to an apparatus for the precise survey measurements. The apparatus includes an n-point feed double-frequency symmetrical antenna, n being an integer. The antenna receives the right-hand circular-polarized L1 and L2 carrier waves from at least four satellites located above the horizon. The system further includes an amplifying circuit conductively connected to the antenna. An amplifying circuit amplifies the modulated right-hand circular- polarized L1 and L2 carrier waves and converts the wave electromagnetic energy into an equivalent electric current containing the appropriate C/A-code, P(Y)-code, and data stream modulations. The system further includes a code-tracking loop conductively connected to the amplifying circuit. The code-tracking loop measures the pseudorange of the apparatus by tracking the C/A-code and P(Y)-code pulse trains from each of the satellites. The system also includes a phase-lock loop conductively connected to the code-tracking loop. The phase-lock loop measures the carrier phase of the apparatus by tracking the carrier wave from each of four or more satellites. A navigation processor is connected to the phase-lock loop. The navigation processor processes the pseudorange and the carrier phase of the apparatus to determine the instantaneous position coordinates, the clock-offset, and the velocity components of the apparatus. A power supply is conductively connected to the navigation processor for supplying the power to the apparatus. A display module is conductively connected to the navigation processor for displaying the position coordinates, the clock-offset, and the velocity components of said apparatus.

The electrical center error ellipsoid of the disclosed GPS receiver with the n-point feed symmetrical antenna is reduced as compared to the electrical center error ellipsoid of a GPS receiver with a single-point feed antenna. The measurement error resulting from the time delay variation of the satellite signal propagating within the symmetrical n-point antenna itself is also significantly reduced as compared with the single-point antenna situation. The measurement error resulting from the azimuth and elevation angular dependencies of the incoming satellite signal is significantly reduced as compared with the single-point antenna situation.

Another aspect of the present invention is directed to the apparatus having an n-point feed system, wherein the number of n points is equal to $2^k$, where k is an integer greater than zero..

The above disclosed apparatus can be used for precise differential GPS static survey measurements. It can be also used for precise differential GPS dynamic survey measurements. This apparatus can be also applied for precise absolute point positioning.

The system including of at least three of the above disclosed apparatus can be used for the heading and attitude measurements to determine the precise vector between each two of these apparatus.

Yet one more aspect of the present invention is directed to a method of survey measurement using an apparatus including a symmetrical double frequency n-point feed antenna, n being an integer, an amplifying circuit, a code-tracking loop, a phase-lock loop, a navigation processor, a power supply, and a display module. The method includes the following steps: (1) supplying the apparatus with the power supply; (2) receiving the right-hand circular-polarized L1 and L2 carrier waves from at least four satellites located above the horizon by the n-point feed double-frequency symmetrical antenna; (3) amplifying the modulated right-hand circular- polarized L1 and L2 carrier waves and converting their electromagnetic energy into an equivalent electric current containing the appropriate C/A-code, P(Y)-code, and data stream modulations by the amplifying circuit; (4) measuring the pseudorange of the apparatus by tracking the C/A-code and P(Y)-code pulse trains from each of at least four satellites by the code-tracking loop; (5) measuring the carrier phase of the apparatus by tracking the carrier wave from each of at least four satellites by the phase-lock loop; (6) processing the pseudorange and the carrier phase of the apparatus to determine the instantaneous position coordinates, the clock-offset, and the velocity components of the apparatus by the navigation processor; and (7) displaying the position coordinates, the clock-offset, and the velocity components of the apparatus by the display module.

FULL DESCRIPTION OF THE PREFERRED EMBODIMENT.

Figure 1:
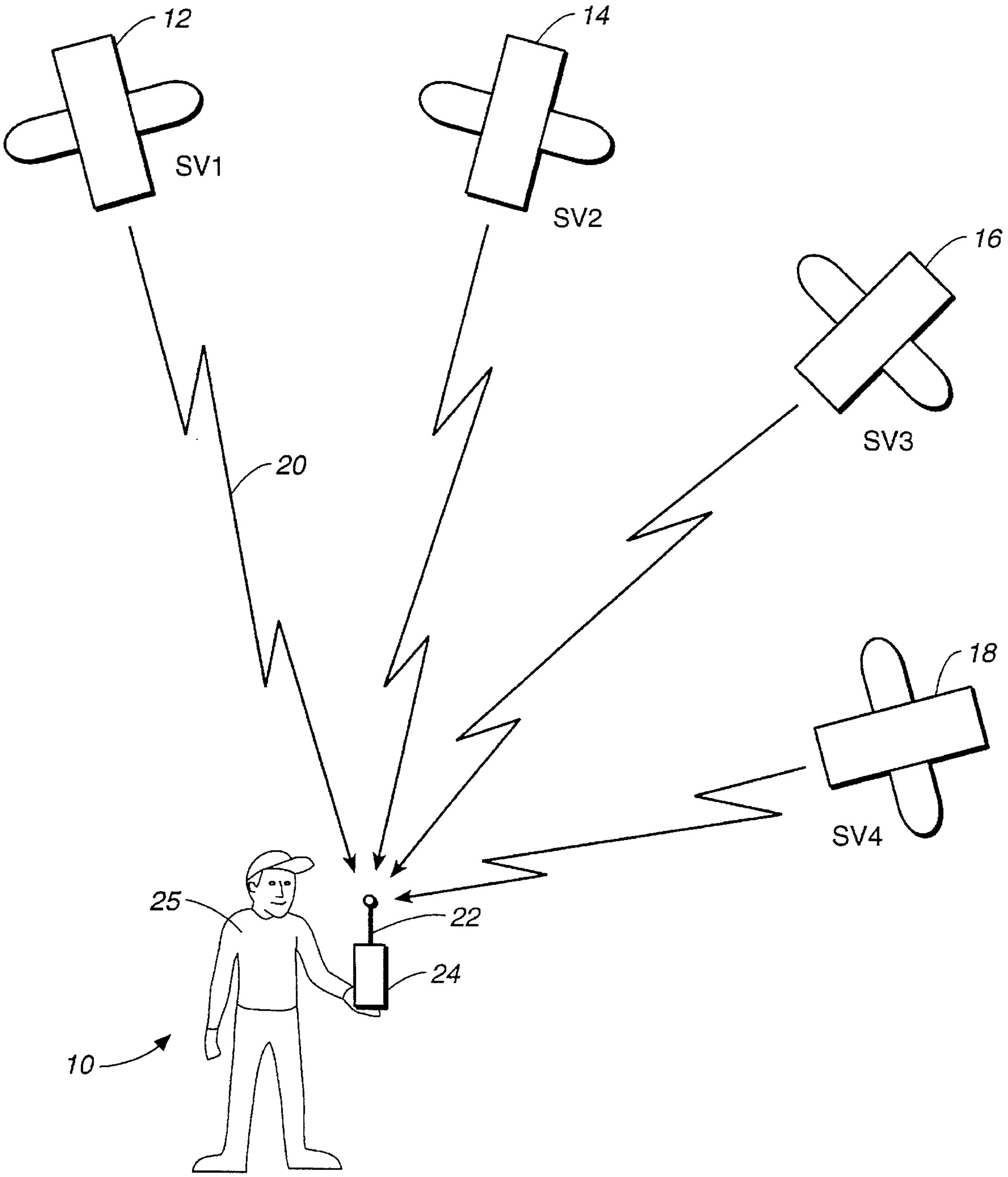
FIG. 1 illustrates a GPS navigation scheme wherein a GPS receiver receives satellite signals from at least four satellite-vehicles SV1, SV2, SV3, and SV4.

FIG. 1 illustrates the Global Positioning System (GPS) navigation scheme 10, wherein an observer 25 carries a GPS receiver 24 which enables him to determine his location and the time of observation. In the preferred embodiment, the GPS antenna 23 is able to receive the satellite signals from at least four satellite-vehicles SV1 (12), SV2 (14), SV3 (16), and SV4 (18). These four satellites are part of the GPS.

The GPS is a system of satellite signal transmitters, with receivers located on the Earth's surface or adjacent to the Earth's surface, that transmits information from which an observer's present location and/or the time of observation can be determined. There is also the Global Orbiting Navigational System (GLONASS), which can operate as an alternative GPS system.

The Global Positioning System (GPS) is part of a satellite-based navigation system developed by the United States Defense Department under its NAVSTAR satellite program. A fully operational GPS includes up to 24 Earth satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to three or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency f1=1575.42 MHz and an L2 signal having a frequency f2=1227.6 MHz. These two frequencies are integral multiplies f1= 1540 f0 and f2=1200 f0 of a base frequency f0=1.023 MHz. The L1 signal from each satellite is binary phase shift key (BPSK) modulated by two pseudorandom noise (PRN) codes in phase quadrature, designated as the C/A-code and P(Y)-code. The L2 signal from each satellite is BPSK modulated by only the P(Y)-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay~$f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can also be determined.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P(Y)-code, is a relatively long, fine-grained code having an associated clock or chip rate of 10 f0=10.23 MHz. A second PRN code for each GPS satellite, sometimes referred to as a clear/acquisition code or C/A-code, is intended to facilitate rapid satellite signal acquisition and hand-over to the P(Y)-code and is a relatively short, coarser-grained code having a clock or chip rate of f0=1.023 Mhz. The C/A -code for any GPS satellite has a length of 1023 chips or time increments before this code repeats. The full P(Y)-code has a length of 259 days, with each satellite transmitting a unique portion of the full P(Y)-code. The portion of P(Y)-code used for a given GPS satellite has a length of precisely one week (7.000 days) before this code portion repeats. Accepted methods for generating the C/A-code and P(Y)-code are set forth in the document GPS Interface Control Document ICD-GPS-200, published by Rockwell International Corporation, Satellite Systems Division, Revision B-PR, 3 Jul. 1991, which is incorporated by reference herein.

The GPS satellite bit stream includes navigational information on the ephemeries of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

A second alternative configuration for global positioning is the Global Orbiting Navigation Satellite System (GLONASS), placed in orbit by the former Soviet Union and now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of f1=(1.602 +9k/16) GHz and f2=(1.246+7k/16) GHz, where k(=0,1,2, . . . 23) is the channel or satellite number. These frequencies lie in two bands at 1.597–1.617 GHz (L1) and 1,240–1,260 GHz (L2). The L1 code is modeled by a C/A-code (chip rate=0.511 MHz) and by a P(Y)-code (chip rate=5.11 MHz). The L2 code is presently modeled only by the P(Y)-code. The GLONASS satellites also transmit navigational data at a rate of 50 Baud. Because the channel frequencies are distinguishable from each other, the P(Y)-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few millimeters.

In differential position determination, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemeries for each identified SATPS satellite. The SATPS signal antenna and signal receiver/processor are part of the user segment of a particular SATPS, the Global Positioning System, as discussed by Tom Logsdon, op cit, p 33–90.

Figure 2:
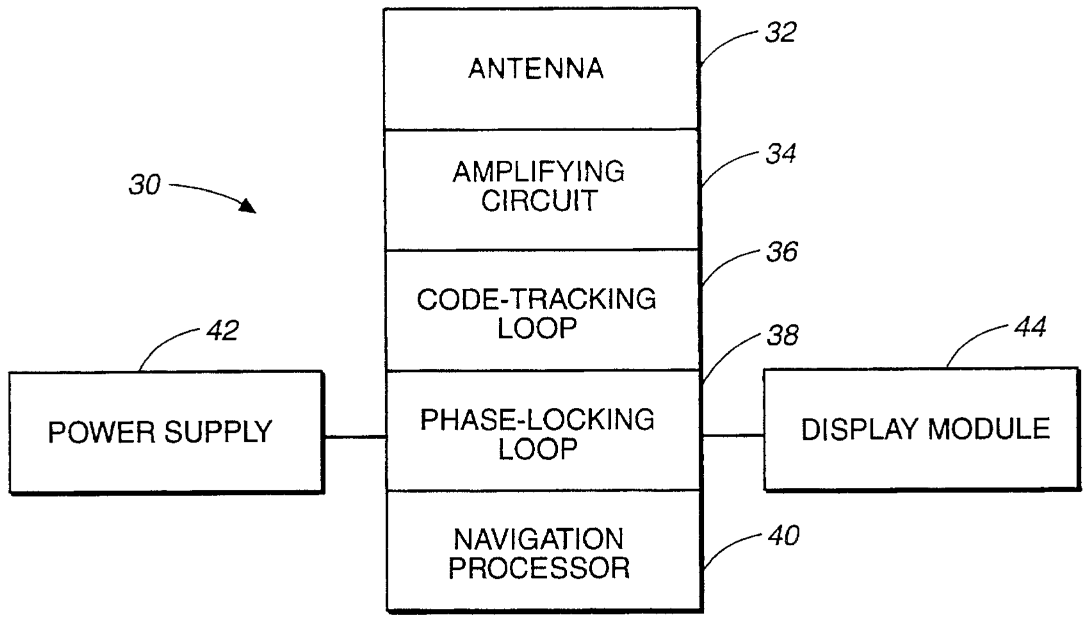
FIG. 2 depicts the functional scheme of the GPS receiver.

There are several major components in a typical SATPS (GPS) receiver 30 as illustrated in FIG. 2. The receiver antenna 32 is designed to pick up the right-hand circular-polarized L1 and/or L2 carrier waves from selected satellites located above the horizon. The amplifying circuit 34 concentrates and amplifies the modulated carrier waves, and converts the wave electromagnetic energy into an equivalent electric current still containing the appropriate C/A-code, P(Y)-code, and data stream modulations.

Two different types of tracking loops are used by a SATPS (GPS) receiver. The code-tracking loop 36 tracks the C/A-code and/or P(Y)-code pulse trains to obtain the signal travel time for each relevant satellite.

The phase-lock loop 38 tracks the satellite's carrier wave phase to obtain its carrier phase. Code-tracking allows the receiver to measure the appropriate pseudoranges to at least four satellites necessary for an accurate positioning solutions. Carrier phase tracking allows the receiver to measure the corresponding carrier phase so the receiver can estimate more accurate values for the receiver's pseudorange and the three mutually orthogonal velocity components.

The navigation processor 40 uses the pseudorange and the carrier phase measurements to determine the instantaneous position coordinates and the instantaneous velocity components of the GPS receiver. The memory units in the navigation processor provide erasable storage for the various types of computations. Each time the receiver is turned off, nonvolatile portions of its microprocessor memory are used to save the last set of position coordinates, together with the last set of almanac constants. When the receiver is turned back on again, these values are used to obtain the first estimates of position and to determine which four satellites are most favorably positioned for accurate navigation.

For some specialized applications the microprocessor's memory is used to store large arrays of pseudorange measurements for precise postprocessing. In postprocessing applications, improved values for the satellite's ephemeries constants obtained after the fact are used to enhance the accuracy of delayed navigation solutions. Surveying and military test range applications, for instance, obtain substantial accuracy improvements by using appropriate post-processing techniques.

A DC power supply 42 is needed to operate a GPS receiver. It is usually disposable lead-acid batteries or rechargeable nickel-cadmium (NI Cd) batteries. A planar DC battery can be also used to operate the portable GPS receiver. But the electrical systems of trucks and tanks can also provide the requisite power.

The control display module 44 is a convenient man-machine interface between the user and a GPS receiver. It is designed to accept inputs and instructions from the user, including the desired operating modes, stationary and moving waypoints, coordinate systems, and any necessary encryption keys. The current position and velocity are automatically displayed on light-emitting diodes (LEDs), liquid crystal display (LCD), or cathode ray tube (video) screens. The control display unit also displays the exact time and waypoint navigation instructions under efficient user control, as discussed by Tom Logsdon, op cit, p 49–52.

The pseudorange signals PR and carrier phase signals Φ, received at a time t, from a satellite j by a receiver i, are expressed as $$PR(t;i;j;\alpha;\epsilon)=R(t;i;j)+SCB(t;j)+RCB(t;i)+\tau_T(t;i;j)+\tau_I((t;i;j)+m(t;i;j)+\eta(t;i;j)+\tau_A(t;i;j;\alpha;\epsilon), \quad (1)$$

$$\Phi(t;i;j;\alpha;\epsilon)=\lambda N(i;j)+R(t;i;j)+SCB(t;i)+RCB(t;i)+\tau_T(t;i;j)-\tau_I(t;i;j)+m'(t;i;j)+\eta(t;i;j)+\tau'_A(t;i;j;\alpha;\epsilon), \quad (2)$$

where R(t;i;j) ("GPS range") and Φ(t;i;j) represent the "true" range from the receiver i to the satellite number j at the time t, and in the corresponding carrier phase, as determined from the GPS navigation ephemerides (or almanac information) received by the receiver 11*i*, λ is the GPS carrier signal wavelength, N(i;j) is the integer number of wavelengths associated with the carrier phase signal, and α and ε are the azimuth and the angle of elevation of the incoming satellite signal. The number N is initially ambiguous; but once N is found, it does not change with time as long as continuous carrier lock is maintained. The carrier phase signal Φ(t;i;j) is obtained from analysis of integrated carrier phases of the SATPS signals received and includes error contributions from the sources indicated on the right hand side of Eq.(2). Here, SCB(t;i;j) is the satellite clock bias error, RCB(t;i;j) is the receiver clock bias error, $\tau_T$(t;i;j) and $\tau_I$(t;i;j) are the tropospheric signal propagation time delay and ionospheric signal propagation time delay, m(t;i;j) and m'(t;i;j) are the multipath signal error contributions for the pseudorange and carrier phase signals, and η(t;i;j) and η'(t;i;j) are the receiver noise error contributions for the pseudorange and carrier phase signals. $\tau_A$(t;i;j;α;ε) is the signal propagation time delay related to the noncircularity of the receiver's antenna. $\tau'_A$(t;i;jα;ε) is the error contribution for the carrier phase signal related to the antenna signal propagation time delay.

There is a technique to minimize the ionospheric signal propagation time delay $\tau_T$(t;i;j) which varies approximately as the inverse square of signal frequency f (delay~$f^{-2}$). The idea is to use the double-frequency antenna to receive the satellite signal. This phenomenon is discussed by MacDoran in U.S. Pat. No. 4,463,357, which discussion is incorporated by reference herein. When transit time delay through the ionosphere is determined, a phase delay associated with a given carrier signal can be determined.

There are different techniques to eliminate or minimize the majority of the satellite signal delays. The present invention minimizes the time delay related to the propagation of the satellite signal in the receiver's antenna itself.

Figure 3A:
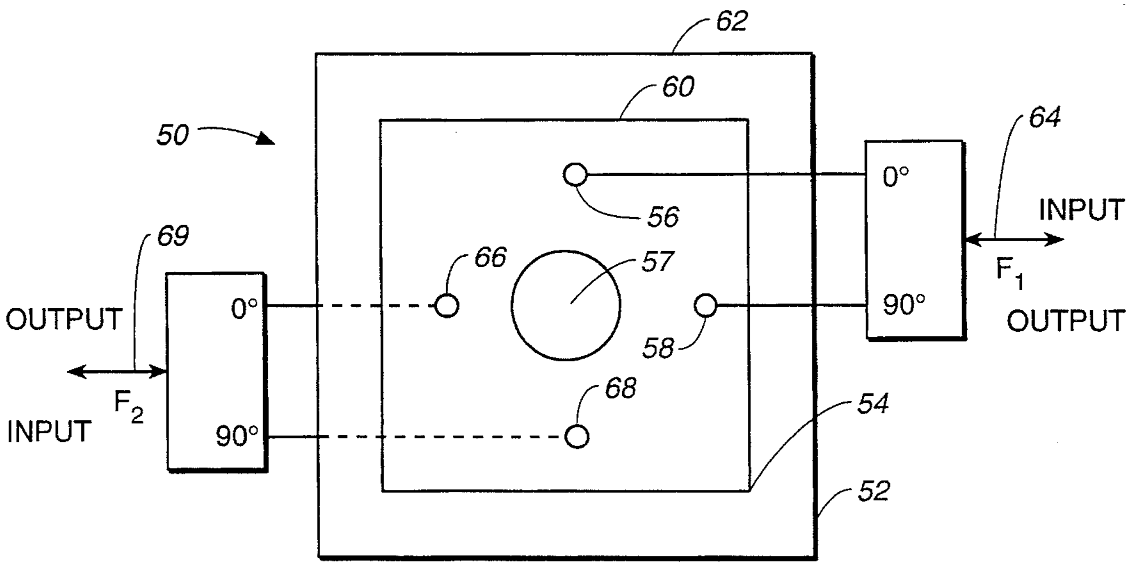
FIG. 3A shows a two-point feed drive GPS antenna.

FIG. 3A illustrates a double-frequency two-point drive antenna 50 of the GPS receiver which is a subject of the present invention. Each GPS satellite transmits two spread spectrum, L-band carrier signals: an L1 signal having a carrier frequency f1=1575.42 Mhz and an L2 signal having a carrier frequency f2=1227.6 Mhz. Accordingly, the antenna 50 is a double patch antenna, wherein the patch 54 has the dimensions equal to one-half of wavelength (λ1)/2 =9.5 cm of the satellite signal with carrier frequency f1, and wherein the patch 52 has the dimensions equal to one-half of the wavelength (λ2)/2=12 cm of the satellite signal with carrier frequency f2.

It is understood, that the two-point antenna of the GLONASS receiver designed to receive signals from the GLONASS satellite and having dimensions related to the wavelengths of the signals generated by the GLONASS satellite is also within the scope of the present invention.

The feed points 56 and 58 are placed within the surface of the internal patch of the antenna to achieve the 90 degree difference in phase between two feed channels which achieves the circular polarization of the GPS receiver. The two-point double frequency antenna 50 has a separate two feed point system for each frequency: a two point feed system 64 for the frequency f1 and a two point feed system 69 for the frequency f2.

The electrical center of the antenna 50 of FIG. 3A is the reception point of a single satellite signal. In reality the antenna 50 receives the satellite signals from at least four satellite-vehicles 12, 14, 16, and 18 of FIG. 1. The physical location of the electrical center is different for different signals incoming from different satellites. Accordingly, the location of the electrical center has an angular dependence on the azimuth α and the angle of elevation ε of the satellite signal. In geometrical terms it means that the plurality of the electrical centers occupies the electrical center error ellipsoid 57 for the two-point feed antenna 50. Therefore, the time delay variation of the satellite signal associated with the GPS receiver's antenna also has an angular dependence on the azimuth α and the angle of elevation ε of the incoming signal.

The dimensions of the electrical center error ellipsoid for a code-phase derived single point antenna is approximately 50 cm. The time group delay for a code-phase signal is approximately 2 nsec. For a carrier phase signal the dimensions of the electrical center error ellipsoid for a single point antenna is approximately 3–4 mm.

A two-point antenna is more a symmetrical one than a single point antenna. Accordingly, the dimensions of the electrical center code-phase derived error ellipsoid 57 is approximately 20 cm and is significantly smaller than the dimensions of the electrical center error ellipsoid for a single-point antenna. The two-point antenna depicted in FIG. 3A also decreases the angular dependence of a satellite signal time delay variation $\tau_A$(t;i;j;α;ε) on azimuth α and angle of elevation ε of the satellite signal. As a result, the time delay variation associated with two-point antenna is approximately 0.6 nsec.

The dimensions of the electrical center error ellipsoid for carrier signals in case of a two-point antenna is about 1–2 mm which is less than the dimensions of the electrical center error ellipsoid for carrier signals in a single point antenna situation.

Figure 3B:
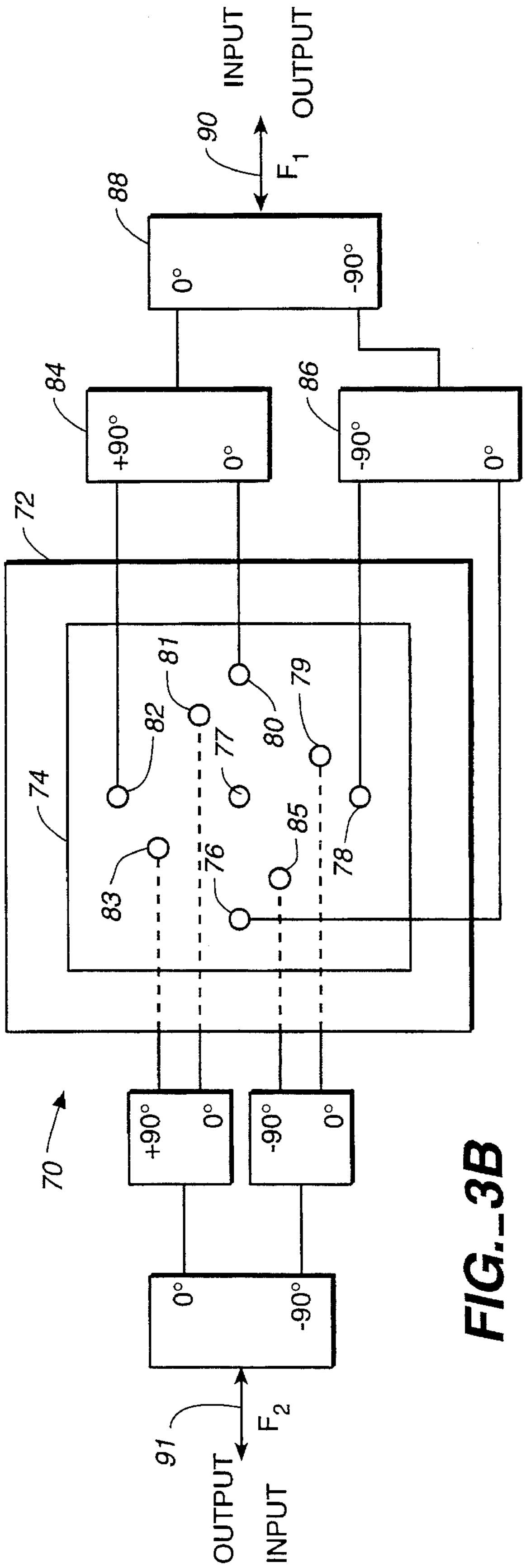
FIG. 3B illustrates a four-point drive symmetrical GPS antenna.

FIG. 3B illustrates the four-point antenna 70 used in the GPS receiver which is also the subject-matter of the present invention. The antenna 70 is a double patch antenna, wherein the patch 74 has the dimensions equal to one-half of the wavelength ($\lambda$1)/2 corresponding to the frequency f1, and wherein the patch 72 has the dimensions equal to one-half of the wavelength ($\lambda$2)/2 corresponding to the frequency f2 of the satellite signal.

It is understood, that the four-point antenna of the GLONASS receiver designed to receive signals from the GLONASS satellite and having dimensions related to the wavelengths of the signals generated by the GLONASS satellite is also within the scope of the present invention.

The four-point double frequency antenna 70 also has a separate four-point teed point system for each frequency: a four-point feed system 90 for the frequency f1 and a four-point feed system 91 for the frequency f2. Four feeding points 82, 80, 78, and 76 for frequency f1 and four feeding points 83, 81, 79, and 85 for frequency f2 are placed geometrically in such a way as to achieve the circular polarization of the GPS receiver for each frequency as shown in FIG. 3B. The four-point antenna is more symmetrical than the two-point antenna. Accordingly, the dimensions of the electrical center error ellipsoid 77 of the four-point antenna are less than 10 centimeters, which is two times smaller than the dimensions of the electrical center error ellipsoid of the two-point antenna (approximately 20 centimeters), and are less dependent on the azimuth and angle of elevation of the incoming satellite signal as compared with the two-point antenna situation. The time delay variation of the satellite signal received by the four-point antenna is approximately ¼ nsec which is four times smaller than the time delay variation (approximately 1 nsec) of the satellite signal received by the two-point antenna. The four-point antenna time delay variation is less angular dependent on the azimuth and angle of elevation of the incoming signal as compared with the two-point situation.

Figure 3C:
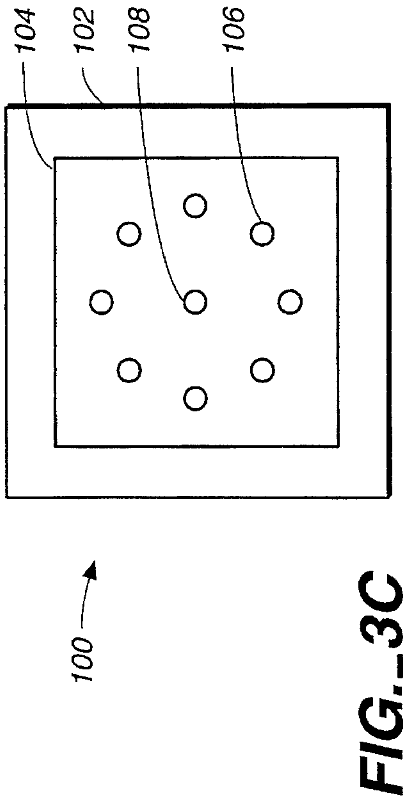
FIG. 3C depicts an n-point drive symmetrical GPS antenna.

FIG. 3C shows the general case of n-point symmetrical feed antenna 100 used for the GPS receiver, wherein n is an integer $2^k$, where k is greater than 1. This is a double-frequency antenna having two patches 102 and 104 with the dimensions related to the wavelengths of the incoming signal. See the discussion above. This antenna has n symmetrical feed points (like point 106) placed geometrically on the patch 104 in such a way as to achieve the circular polarization of the GPS receiver with n-point antenna. The symmetry of the n-point antenna is superior to the symmetry of a m-point antenna, wherein n is greater than m. Therefore, the dimensions of the ellipsoid of electrical centers for the n-point antenna 108 is smaller than the dimensions of the electrical center error ellipsoid for the m-point antenna with $n \geqq m$, and the ellipsoid itself geometrically is very close to the complete sphere. Accordingly, the n-point antenna used in the GPS receiver is able to almost completely eliminate the time delay variation associated with the propagation of the satellite signal within the n-point antenna itself. However, the greater the number n of feed centers the bigger losses in the GPS receiver associated with the radiation of energy of the incoming signal. If the losses are too big the satellite signal becomes too weak. Therefore, there exists some optimum number n which allows achievement of the minimum time delay variation wherein the losses of energy of the signal are still satisfactory.

The GPS receiver with the n-point symmetrical feed antenna can be used for the purposes of the differential GPS survey, both static and dynamic, and also for the purposes of the absolute GPS positioning.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for the precise survey measurements comprising:

an n-point feed double-frequency double-patch antenna, n being a positive integer, said antenna receiving the right-hand circular-polarized L1 and L2 carrier waves from at least four satellites located above the horizon; said first patch having dimensions equal to one-half of the wavelength of said L1 carrier wave, said second patch having dimensions equal to one-half of wavelength of said L2 carrier wave;

an amplifying circuit, said circuit being conductively connected to said antenna, said circuit amplifying said modulated right-hand circular- polarized L1 and L2 carrier waves and converting their electromagnetic energy into an equivalent electric current containing the appropriate C/A-code, P(Y)-code, and data stream modulations;

a code-tracking loop, said code-tracking loop being conductively connected to said amplifying circuit, said code-tracking loop measuring the pseudorange of said apparatus by tracking the C/A-code and P(Y)-code pulse trains from each of said satellites;

a phase-lock loop, said phase-lock loop being conductively connected to said code-tracking loop, said phase-lock loop measuring carrier phase of said apparatus by tracking the carrier wave from each of said four relevant satellites;

a navigation processor, said navigation processor being connected to said phase-lock loop, said navigation processor processing said pseudorange and said carrier phase of said apparatus to determine the instantaneous position coordinates, the clock-offset, and the velocity components of said apparatus; and a display module conductively connected to said navigation processor for displaying the position coordinates, the clock-offset, and the velocity components of said apparatus;

wherein the electrical center error ellipsoid of said n-point feed antenna is reduced as compared to the electrical center error ellipsoid of a GPS receiver with a single-point feed antenna; wherein the dimensions of the electrical center error ellipsoid for a code-phase derived single point antenna is 50 cm, and wherein the dimensions of the electrical center error ellipsoid for a carrier-phase derived single point antenna is 3–4 mm;

and wherein the measurement error resulting from the time delay variation of the satellite signal propagating within the n-point antenna itself is significantly reduced as compared with the measurement error resulting from the time delay variation of the satellite signal propagating within the single-point antenna;

and wherein the measurement error resulting from the azimuth and elevation angular dependencies of the incoming satellite signal is significantly reduced as compared with the measurement error resulting from the azimuth and elevation angular dependencies of the satellite signal incoming into a SPS receiver with a single-point antenna.

2. The apparatus of claim 1, wherein the number of n points is equal to $2^k$, where k is an integer greater than zero.

3. The apparatus of claim 1, wherein said apparatus is used for the precise differential GPS static survey measurements.

4. The apparatus of claim 1, wherein said apparatus is used for the precise differential GPS dynamic survey measurements.

5. The apparatus of claim 1, wherein said apparatus is used for the precise absolute point positioning of said apparatus.

6. The apparatus of claim 1, wherein at least three of said apparatus are used for the heading and attitude measurements to determine the precise vector between each two of said apparatus.

7. A method of survey measurement using an apparatus comprising a double frequency double-patch n-point feed antenna, n being a positive integer, an amplifying circuit, a code-tracking loop, a phase-lock loop, a navigation processor, a power supply, and a display module, said method comprising the steps of:

supplying said apparatus by said power supply;

receiving the right-hand circular-polarized L1 and L2 carrier waves from at least four satellites located above the horizon by said n-point feed double-frequency symmetrical antenna;

amplifying said modulated right-hand circular- polarized L1 and L2 carrier waves and converting their electromagnetic energy into an equivalent electric current containing the appropriate C/A-code, P(Y)-code, and data stream modulations by said amplifying circuit;

measuring the pseudorange of said apparatus by tracking the C/A - and P(Y)-code pulse trains from each of said at least four satellites by said code-tracking loop;

measuring the carrier phase of said apparatus by tracking the carrier wave from each of said at least four satellites by said phase-lock loop;

processing said pseudorange and said carrier phase of said apparatus to determine the instantaneous position coordinates, the clock-offset, and the velocity components of said apparatus by said navigation processor; and displaying the position coordinates, the clock-offset, and the velocity components of said apparatus by said display module;

wherein the electrical center error ellipsoid of said n-point feed antenna is significantly reduced as compared to the electrical center error ellipsoid of a GPS receiver with a single-point feed antenna; wherein the dimensions of the electrical center error ellipsoid for a code-phase derived single point antenna is 50 cm, and wherein the dimensions of the electrical center error ellipsoid for a carrier-phase derived single point antenna is 3–4 mm;

and wherein the measurement error resulting from the time delay variation of the satellite signal propagating within the n-point antenna itself is significantly reduced as compared with the measurement error resulting from the time delay variation of the satellite signal propagating within the single-point antenna;

and wherein the measurement error resulting from the azimuth and elevation angular dependencies of the incoming satellite signal is significantly reduced as compared with the measurement error resulting from the azimuth and elevation angular dependencies of the satellite signal incoming into a SPS receiver with a single-point antenna.

8. The apparatus of claim 2, wherein the number of n points is equal to 4, said apparatus further comprising:

two sets of 4-point feeding means, said first set of 4-point feeding means being used for feeding said L1 satellite signal into said first patch L1 antenna, said first set of 4-point feeding means being attached to said first patch L1 antenna, said second set of 4-point feeding means being used for feeding said L2 satellite signal into said second patch L2 antenna, said second set of 4-point feeding means being attached to said second patch L2 antenna; wherein said first 4-point feeding means and said second 4-point feeding means are placed geometrically in such a way as to achieve the circular polarization of the SPS receiver for each said L1 signal and said L2 signal.

9. The method of claim 7, wherein the number of n points is equal to 4, and wherein said double-patch double-frequency antenna comprises two sets of 4-point feeding means; and wherein said step of receiving the right-hand circular- polarized L1 and L2 carrier waves from at least four satellites located above the horizon by said 4-point feed double-patch double-frequency antenna further comprises the steps of:

attaching said first set of 4-point feeding means to said first patch L1 antenna and attaching said second set of 4-point feeding means to said second patch L2 antenna in such a way as to achieve the circular polarization of the SPS receiver for each said L1 signal and said L2 signal;

feeding said L1 satellite signal into said first patch L1 antenna by said first set of 4-point feeding means; and feeding said L2 satellite signal into said second patch L2 antenna by said second set of 4-point feeding means.

* * * * *